April 7, 1953

H. F. LEONHARD 2,633,885

GRAIN CUTTING AND POLISHING MACHINE

Filed June 24, 1949

INVENTOR.
HERBERT F. LEONHARD
BY
his Attorney

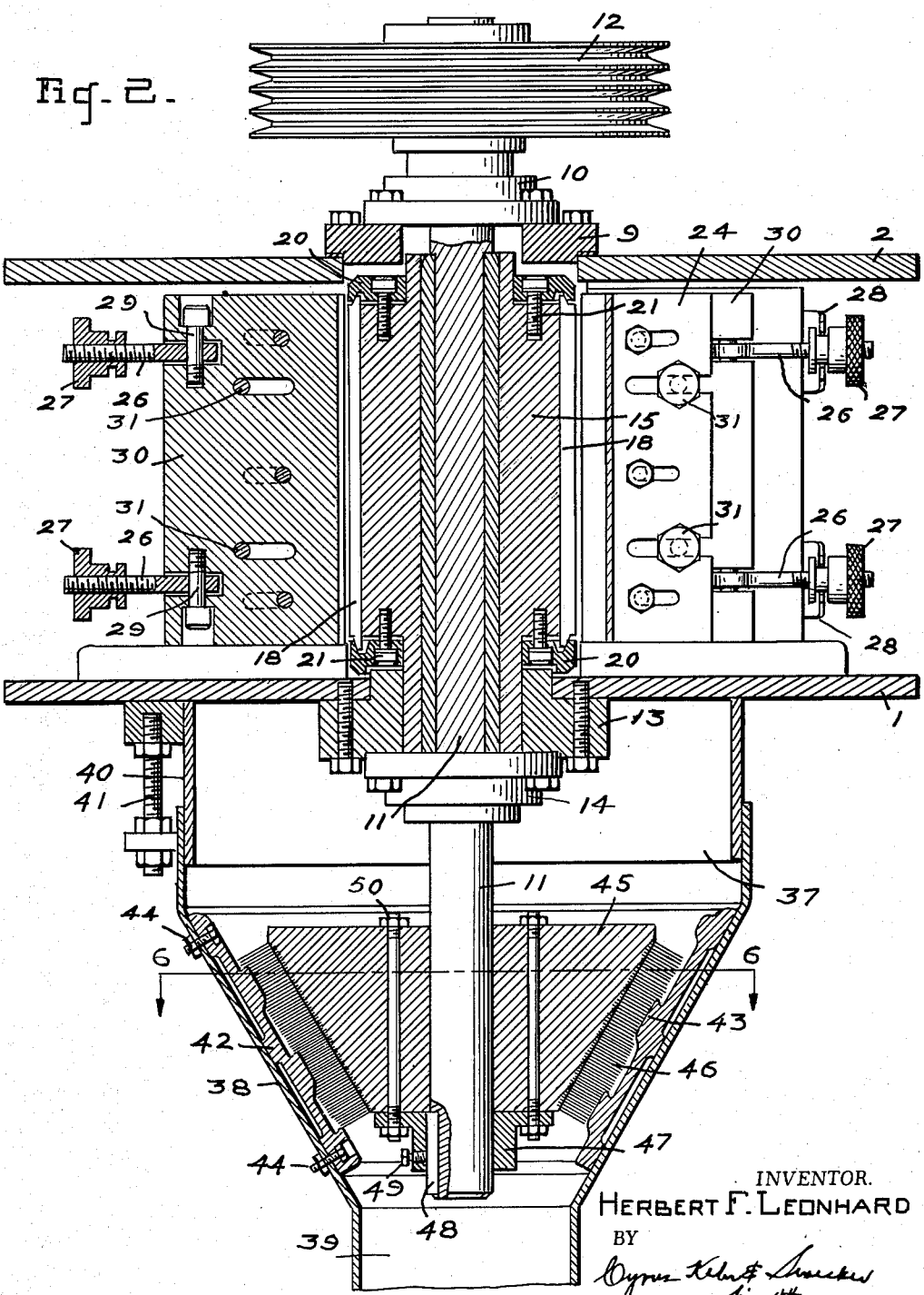

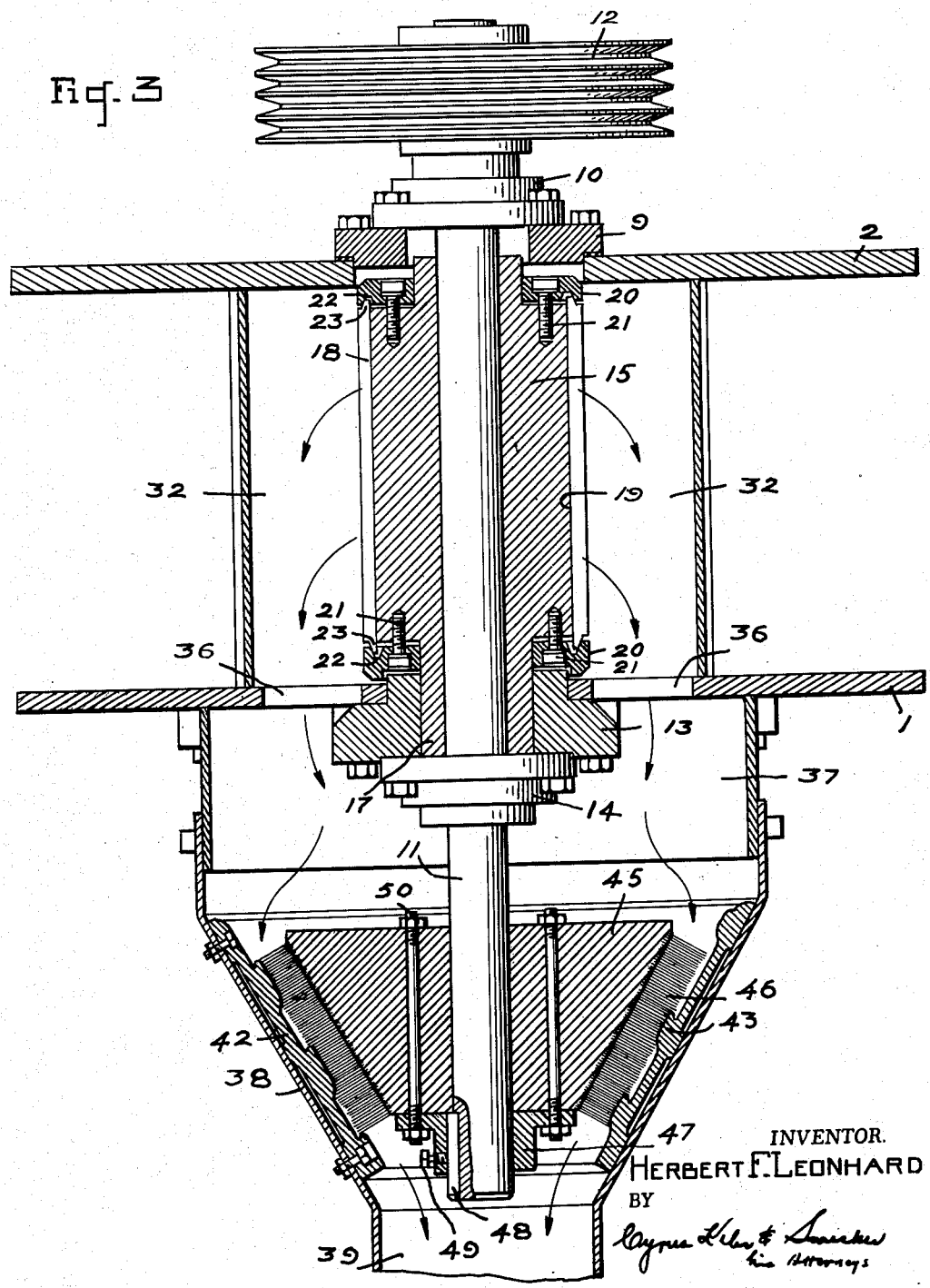

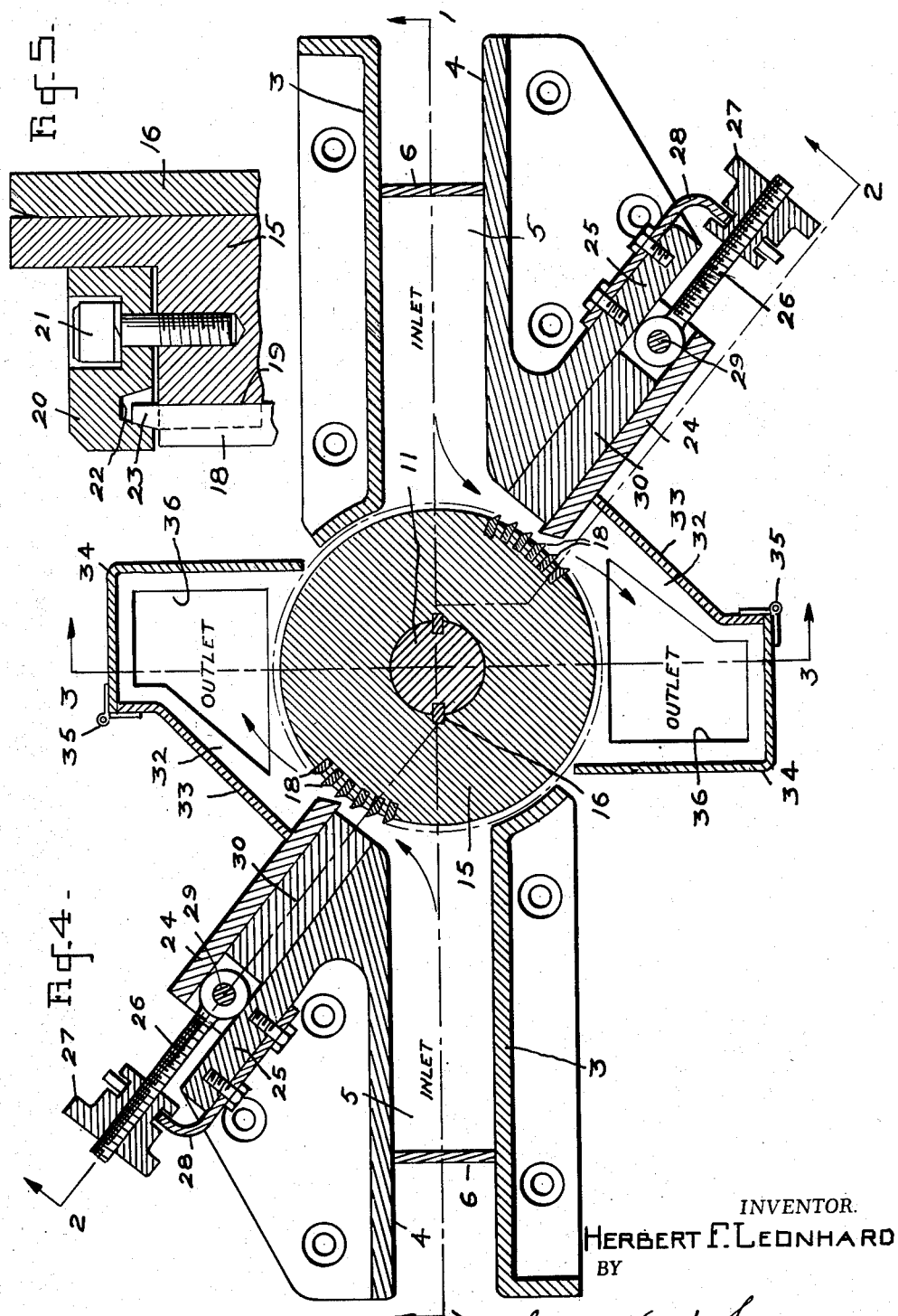

April 7, 1953   H. F. LEONHARD   2,633,885
GRAIN CUTTING AND POLISHING MACHINE
Filed June 24, 1949   5 Sheets-Sheet 5

INVENTOR.
HERBERT F. LEONHARD
BY

Patented Apr. 7, 1953

2,633,885

UNITED STATES PATENT OFFICE 2,633,885

GRAIN CUTTING AND POLISHING MACHINE

Herbert Frank Leonhard, Knoxville, Tenn., assignor to W. J. Savage Company, Knoxville, Tenn., a corporation of Tennessee Application June 24, 1949, Serial No. 101,125

4 Claims. (Cl. 146—71.5)

This invention relates to improvements in grain cutting and polishing machines of the character used particularly for cutting and polishing small grains, such as corn, wheat, barley, rice, etc. It is adapted especially for cutting corn into sizes useful as hominy and hominy grits, and for polishing the cut pieces of the grain.

Grain cutters of the character used heretofore have been expensive and objectionable. They have caused an excess of meal and fines, which is undesirable because they result in less usable particles for the purpose intended. Moreover, such cutting machines have required more machinery and equipment in order to produce the effects desirable, of both cutting and polishing the grain particles, which adds to the expense of installation and maintenance, as well as the operation thereof.

One object of this invention is to improve the process of cutting and finishing the grain segments in a more practical manner than has been customary heretofore, producing a cleaner segment of grain without an excess of meal or fines, and also making it possible to produce larger pieces of grain in more acceptable and desirable forms.

A further object of the invention is to simplify and improve the cutting machinery to provide for the use of less machinery and equipment, with the resultant more efficient operation at lower cost of maintenance and use, and without requiring the use of a screen as a part of the cutting machine. Where a screen is required in order to produce larger pieces of grain, the largest perforations that can be used for corn are of a size of $\frac{5}{16}''$. Any larger perforation will let the whole kernel of the corn fall through without being cut. When a screen is used, the uncut grain is returned by the rotary knives to the bed knife for recutting, which thereby not only increases the cost of production and operation of the machinery but reduces its capacity.

Another object of the invention is to increase the production of a cutting machine by providing for the contact of the grain with the cutter at only one point, which is made possible by the continuous cutting edges on the rotary cutter, as well as the fact that no grain is returned to be recut. The continuous cutting edges on the rotary cutter eliminate friction, which results in a low power consumption as well as a reduction in the amount of fines produced. As a result, the production is increased materially with low power consumption, as compared with machines used heretofore.

Still another object of the invention is to provide for the continuous cutting and polishing of the grain in one machine, whereby the individual cut pieces are separated and polished without requiring a separate polishing and separating machine. This improves the quality of the product without requiring a separate machine and a separate operation, as has been necessary usually heretofore.

These objects may be accomplished, according to one embodiment of the invention, by providing cutters with continuous cutting edges in position to cooperate with stationary cutter knives, preferably arranged in an upright direction and so disposed that several stationary knives can be employed so that fresh grain is fed to each knife with no grain returned to be recut. Thus, continuous cutting edges are provided on the rotary cutter with substantially no friction created, which results in low power consumption and low fines production.

No screen is required in the machine because the grain passes directly to the cutters, is severed thereby, and then falls directly to the polishing device, which separates the cut particles of grain and polishes the surface thereof in the best usable sizes. This makes it possible to produce a greater capacity of cut grain with less power consumption, in more acceptable and desirable form and with less fines and meal produced, as compared with machines used heretofore.

This embodiment of the invention is illustrated in the accompanying drawings, in which:

Fig. 2 is a similar view taken on the line 2—2 in Fig. 4;

Fig. 3 is a similar view on the line 3—3 in Fig. 4;

Fig. 4 is a horizontal sectional view through the machine on the line 4—4 in Fig. 1;

Fig. 5 is a detail cross section through the mounting of the rotary knives;

Figure 1:
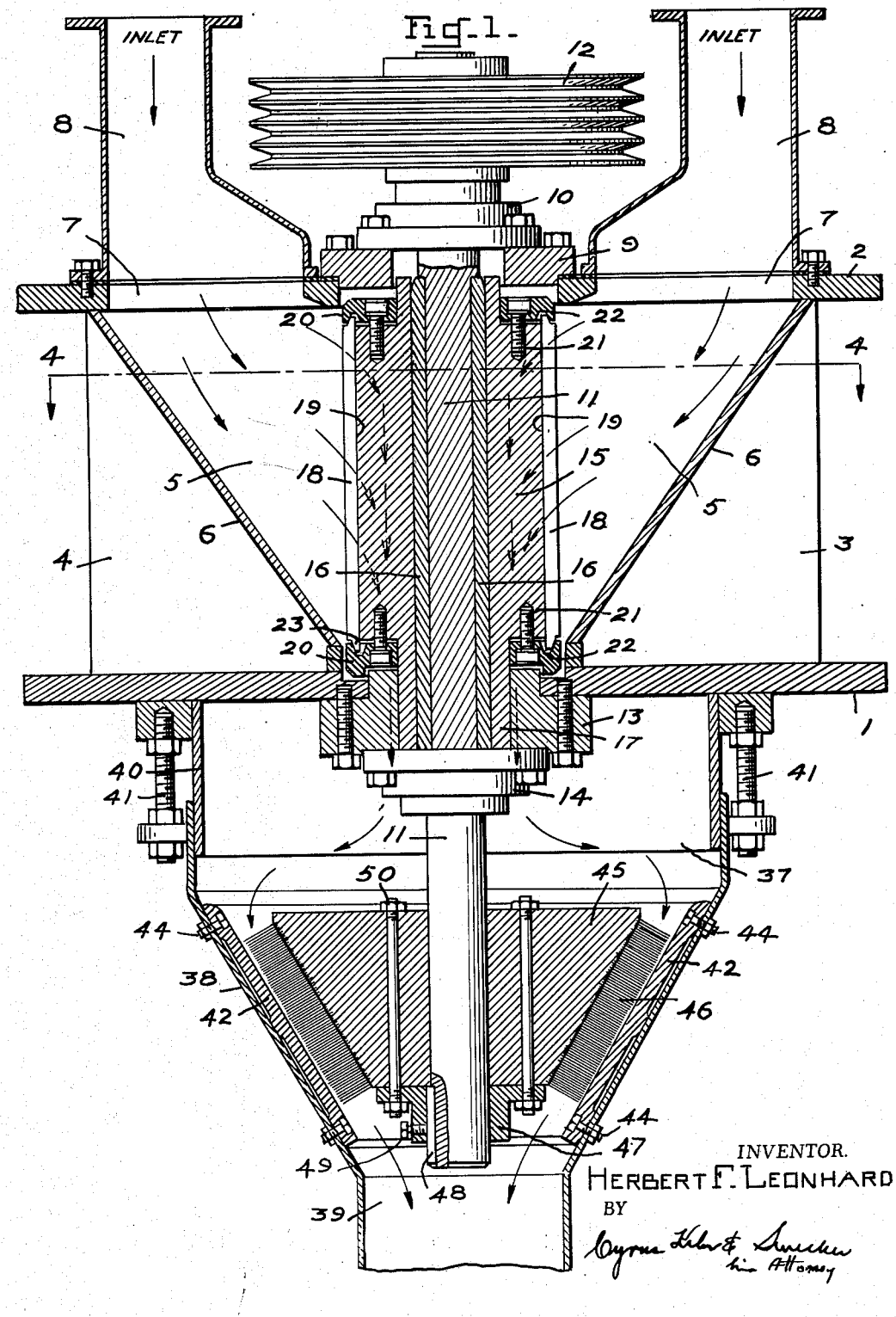
Fig. 1 is a vertical sectional view through the cutting and polishing machine, taken on the line 1—1 in Fig. 4.

In the embodiment of the invention as illustrated, the machine is shown as including bottom and top support plates 1 and 2, separated from each other by hopper sides 3 and 4, which hopper sides are arranged in pairs, as shown in Fig. 4, on opposite sides of the axial center of the machine. Hoppers 5 are formed between the plates 3 and 4 by inclined hopper plates 6 secured in fixed relation between the hopper sides 3 and 4.

The top plate 2 has an opening 7 therein in registry with each of the hoppers 5. An inlet conduit 8 is connected with the top plate 2 about each of the openings 7 and is adapted to supply grain to the hopper.

Mounted in an opening in the top plate 2 is a support ring 9 which is fixed to the top plate. A bearing ring 10 is secured in turn to the support ring 9. The bearing ring 10 forms a step-bearing within which one end portion of a shaft 11 is journaled and supported. The shaft 11 is shown as provided with driving means mounted thereon in the form of a multiple sheave 12 for rotating the shaft.

The bottom support plate 1 also has an opening therein within which is mounted and secured a support ring 13, to which in turn is connected a bearing ring 14. The shaft 11 extends downwardly through the bearing ring 14 and is journaled therein and is also extended an appreciable distance below the bearing ring.

Figure 8:
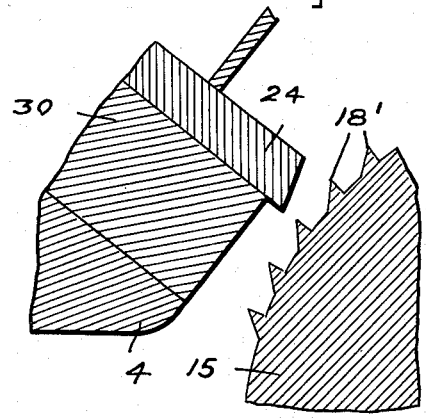
Fig. 8 is a similar view showing a modified form of the rotary knives.

A cutter body or drum is shown at 15 secured by keys 16 to the shaft 11 in secure tight relation to the shaft, to rotate therewith. The drum 15 has a depending reduced end 17 journaled in the support ring 13, as shown in Fig. 1. The drum 15 carries on its periphery a plurality of cutter blades extending lengthwise thereof throughout the major portion of the length of the drum, as indicated at 18. In the form shown in Figs. 1 to 7, the cutter blades 18 are inserted in grooves 19 in the periphery of the drum 15 and secured tightly in place therein, although, if desired, these cutter blades may be formed integrally with the body of the drum 15, as shown at 18' in Fig. 8. In either event, the cutter blades are rigid with the drum and are spaced at intervals throughout the circumference thereof, a suitable or desired number of cutting blades being used to provide the desired cutting action of the grain.

Where separate cutter blades are employed, as shown in Figs. 1 to 7, these may be retained in place by cap rings 20 secured by screws 21 to the opposite ends of the drum 15, as shown more in detail in Fig. 5. Each of the cap rings 20 has an annular face groove 22 in the inner face thereof in position to receive therein a projection 23 on each of the cutter blades 18. The contacting faces of the projections 23 and grooves 22 are oblique, so that the tightening action of the cap rings 20 on the drum 15 will cause the blades 18 to be drawn tightly into secure relation in the respective grooves 19 in the drum and hold these cutter blades securely in place.

Spaced on opposite sides of the rotary cutter assembly are stationary cutting knives 24, two of which are shown in Figs. 2 and 4 as used on diametrically opposite sides of the center axis of the rotary cutter assembly, although it will be appreciated that any desired number of stationary cutters may be used, spaced at intervals therearound. Each of the stationary knives 24 is shown as mounted on a flange 25 projecting laterally from the hopper side plate 4, capable of adjustment toward and from the periphery of the rotary cutter assembly to vary the spacing between the cutting edges of the blades 18 and the knife 24. Such an adjustment will provide for variation of size of the cut grain.

While any suitable or desired form of means may be used for providing the adjustment of the stationary knife 24, I have shown this knife as adjustable by means of eye-bolts 26 having thumb nuts 27 threaded thereon, and each engaging a forked arm 28 mounted on the bracket 25. The eye-bolts 26 are swiveled at 29 to a support plate 30 on which the knife 24 is detachably and adjustably secured by set screws, generally indicated at 31 in Fig. 2.

On the opposite side of the stationary knife 24 from the inlet hopper 5 is an outlet chamber 32, as shown in Figs. 3 and 4. The outlet chamber 32 has a fixed wall 33 secured between the bottom and top plates 1 and 2, and a movable side 34 which closes the remainder of the chamber 32 to the periphery of the rotary cutter assembly, as will be evident from Fig. 4. The wall portion 34 is hinged at 35 to the fixed wall 33, capable of opening movement with respect thereto to clean out the outlet chamber when required. A discharge opening 36 is formed in the bottom plate 1 for passage of the cut grain from the discharge chamber 32 into a polishing chamber, generally designated at 37.

The polishing chamber 37 is in the form of a hopper, generally designated at 38, having a discharge conduit 39 connected with the lower end thereof for directing the cut grain from the machine. The upper end of the hopper 38 extends about a sleeve 40 in telescoped relation therewith, and is supported by tie bolts 41 that depend from the support plate 1, whereby the hopper 38 may be adjusted up and down with respect to the bottom support plate.

Figure 6:
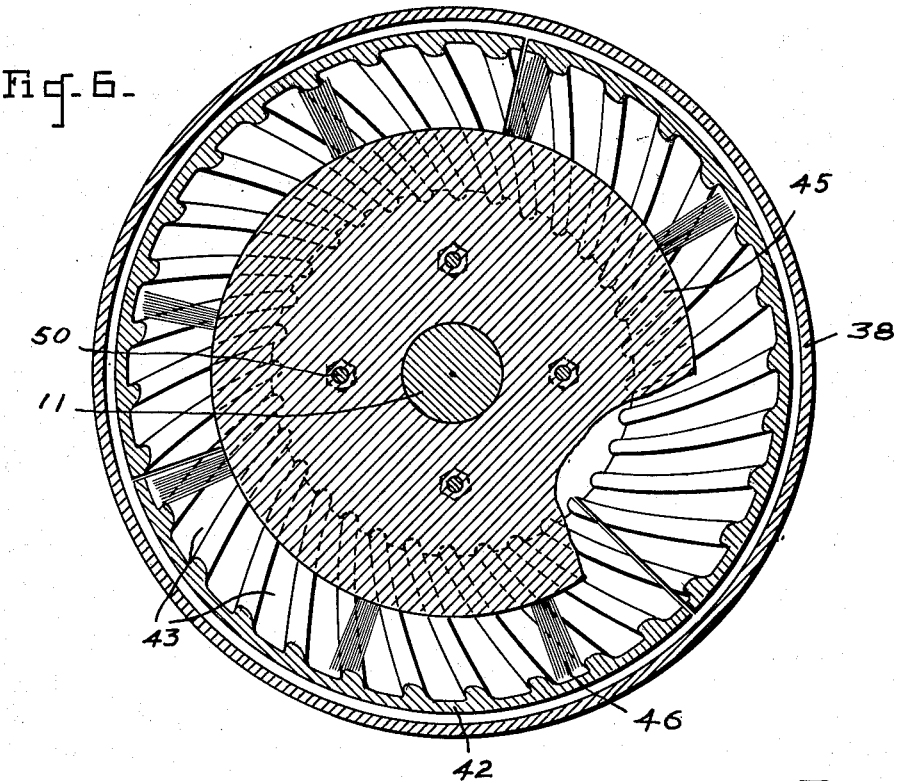
Fig. 6 is a horizontal sectional view on the line 6—6 in Fig. 2.
Figure 7:
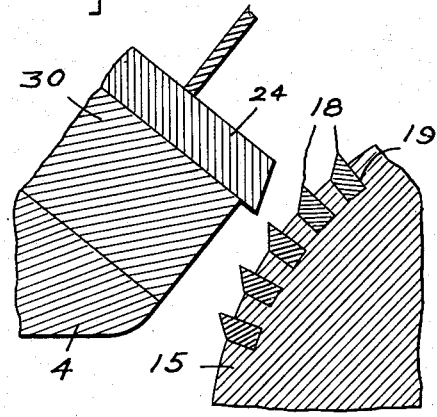
Fig. 7 is a detail cross section illustrating the relation of the rotary and stationary knives.

Mounted on the inner surface of the hopper 38 is a polishing plate 42, preferably having corrugations 43 on the inner face thereof, as shown in Fig. 6, which corrugations are spaced at intervals throughout the circumference of the plate 42 and are shown as somewhat spiral in character, to facilitate the flow of the grain relative thereto. While the plate 42 may be formed in one piece, if desired, it is shown and preferably formed of a plurality of sections fitted together and secured to the hopper 38 by bolts 44.

Operating in co-acting relation with the corrugated polishing plate 42 is a brush carried by the lower end of the shaft 11. This brush is formed in the present embodiment by a head 45 of conical formation having surrounding bristles 46 on the periphery thereof of sufficient length to brush the inner surface of the corrugated plate 42 in wiping relation. The bristles 46 should be relatively stiff and may be formed of fiber or other suitable material which will produce the desired polishing action on the particles of grain, as well as effectively separating the particles from each other.

The brush is shown as supported on the depending end of the shaft 11 by means of a support ring 47 keyed at 48 to the shaft 11 and held in adjusted position with respect thereto by means of a set screw 49. Bolts 50 are connected with a flange of the support ring 47 and extend through the head 45 to secure the head of the brush to the support ring.

The machine is mounted, preferably, with the axis of the shaft 11 in an upright position for natural flow of the grain therethrough by gravity. It is operated by a source of power connected with the shaft, such as a belt drive to the pulley or sheave 12. The rotation of the shaft by power will rotate unidirectionally at the desired speed both the rotary blade assembly and the rotary brush 45—46.

Grain is admitted through the inlet conduits 8 into the hoppers 5 at opposite sides of the rotary blade assembly, and passes by gravity into cutting relation with the blades 18. The latter will carry the particles of grain against the stationary knives 24, causing a severing of the grain into two or more pieces as these particles pass through between the cutters 18 or 18' and the stationary knives 24, thence into the outlet chambers 32.

From the outlet chambers 32 is cut particles of grain will fall through the openings 36 into the polishing chamber 37, generally as indicated by the arrows in the drawings. In the polishing chamber 37 the cut particles of grain will pass between the rotating brush 45—46 and the brushing plate 42 and be subjected therein to the action of the bristles 42 on the corrugations 43. The bristles 46 are arranged continuously throughout the circumference of the head 45 so as to act in a polishing action on all of the grain passing downward through the machine. The grain then is discharged through the conduit 39.

This machine provides for cutting the grain into two or more pieces of larger sizes than usually available, without the use of a surrounding screen, thereby producing better usable sizes of larger pieces and without an excess of meal or fines, which has been objectionable heretofore. The grain comes into contact with the cutter at only one point because of the continuous cutting edges on the rotary cutter. By this action there is no friction created and no grain is returned to be re-cut. The low friction between the cutter and the grain accounts for the low power consumption of the machine, as well as the low production of fines therein. Furthermore, it provides a high capacity, rendering the machine extremely efficient in operation.

In the vertical mounting of the rotary cutter, several stationary cutter knives can be employed and fresh grain fed to each knife. This increases the production of cut grain very materially, whereby an increase of capacity is obtained.

The brush acts to separate the cut pieces and polishes these to the desired extent without requiring a separate polishing and separating machine. This brush is operated effectively by the same source of power as the cutter and directly on the cut particles in the single machine, thus improving the efficiency and power requirements of the machine, as well as the capacity and results obtained.

While the invention has been illustrated and described in one embodiment, it is recognized that variations and changes may be made therein without departing from the invention, except as specified in the claims.

I claim:

1. In a grain cutting machine, the combination of top and bottom support plates, an upright shaft journaled in the support plates, a rotary cutter having substantially vertically extending knives mounted on the shaft between the top and bottom plates, hoppers mounted between the support plates on opposite sides of the shaft, grain inlet means formed in said top plate and communicating with said hoppers, each of the hoppers having a vertically extending stationary knife at one side thereof in opposed relation to the rotary cutter and of equal height with respect to said rotor knives, said rotor and stationary knives being in position to receive grain from the hopper and to sever the grain into particles, and means formed in said bottom plate for discharging the severed particles of grain from the cutter, said discharge means being offset with respect to said inlet means.

2. In a grain cutting machine, the combination of top and bottom support plates, an upright shaft journaled in the support plates, a rotary cutter having vertically extending knives mounted on the shaft between the top and bottom plates, hoppers mounted between the support plates on opposite sides of the shaft, a substantially rectangular knife support plate adjustably secured to one side of each hopper, a vertically extending stationary knife mounted on each of said supports in opposed relation to the rotary cutter and of equal height with respect to said rotary knives, said rotary and stationary knives being positioned to receive grain from the hopper and to sever the grain into particles, means interconnecting said hopper and said support plate for adjusting said stationary blades toward or away from said rotary knives, and means formed in said bottom plate for discharging the severed particles of grain from the cutter, said discharge means being offset with respect to said inlet means.

3. In a grain cutting machine, the combination of top and bottom support plates, an upright shaft journaled on the support plates, a rotary cutter having vertically extending knives mounted between the top and bottom plates, hoppers mounted between the support plates on opposite sides of the shaft, grain inlet means formed in the top plate and communicating with said hoppers, each of the hoppers having a vertically extending stationary knife at one side thereof in opposed relation to the rotary cutter and of equal height with respect to said rotary knives, said rotary and stationary knives being in position to receive grain from the hopper and to sever the grain into particles, means formed in said bottom plate for discharging the severed particles of grain from the cutter, said discharge means being offset with respect to said inlet means, a grain polishing chamber secured to and depending from said bottom plate, said chamber being positioned below said discharge means, said shaft extending through said bottom support plate and into said chamber, a conical brush connected to said shaft for rotation therewith, and a coacting frustoconical surface in opposed relation to said brush and having a substantially corrugated surface facing said brush for the flow of grain therebetween.

4. In a grain cutting machine, the combination of top and bottom support plates, an upright shaft journaled on the support plates, a rotary cutter having vertically extending knives mounted between the top and bottom plates, hoppers mounted between the support plates on opposite sides of the shaft, grain inlet means formed in the top plate and communicating with said hoppers, each of the hoppers having a vertically extending stationary knife at one side thereof in opposed relation to the rotary cutter and of equal height with respect to said rotary knives, said rotary and stationary knives being in position to receive grain from the hopper and to sever the grain into particles, means formed in said bottom plate for discharging the severed particles of grain from the cutter, said discharge means being offset with respect to said inlet means, a substantially circular sleeve depending from said bottom plate and surrounding said discharge means, a grain polishing chamber having the upper end thereof telescoped with said sleeve, means interconnecting said bottom plate and said chamber for adjusting the position of said chamber relative to said bottom plate, said shaft extending through said bottom support plate and said sleeve and into said chamber, a conical brush connected to said shaft for rotation therewith, and a coacting frusto-conical surface in opposed relation to said brush and having a substantially corrugated surface facing said brush for the flow of grain therebetween.

HERBERT FRANK LEONHARD.

REFERENCES CITED

The following references are of record in the file of this patent:

UNITED STATES PATENTS

| Number | Name | Date |
|---|---|---|
| 249,206 | Sawyer | Nov. 8, 1881 |
| 290,120 | Schmitz | Dec. 11, 1883 |
| 524,189 | Baker | Aug. 7, 1894 |
| 900,255 | Ball | Oct. 6, 1908 |
| 1,058,948 | Clark | Apr. 15, 1913 |
| 1,629,138 | Adamson | May 17, 1927 |
| 1,666,798 | Taggert | Apr. 17, 1928 |

FOREIGN PATENTS

| Number | Country | Date |
|---|---|---|
| 137,012 | Germany | Nov. 30, 1901 |
| 311,270 | Germany | June 5, 1917 |